United States Patent [19]

Sato

[11] Patent Number: 5,701,286
[45] Date of Patent: Dec. 23, 1997

[54] SUPER-RESOLUTION OPTICAL HEAD DEVICE WHICH PRODUCES SIDE SPOTS WITHOUT SIDE LOBES

[75] Inventor: Masahiko Sato, Tokyo, Japan

[73] Assignee: NEC Corporation, Tokyo, Japan

[21] Appl. No.: 628,136

[22] Filed: Apr. 4, 1996

[51] Int. Cl.$^6$ .................................................. G11B 7/00
[52] U.S. Cl. .................. 369/109; 369/44.37; 369/107; 369/103; 369/112
[58] Field of Search .................. 369/112, 103, 369/109, 110, 118, 107, 116, 44.32; 359/569, 571, 575

[56] References Cited

U.S. PATENT DOCUMENTS

| | | | |
|---|---|---|---|
| 5,113,286 | 5/1992 | Morrison | 359/569 |
| 5,153,873 | 10/1992 | Spruit et al. | 369/118 |
| 5,349,592 | 9/1994 | Ando | 369/112 |
| 5,434,840 | 7/1995 | Ezuka et al. | 369/112 |
| 5,612,942 | 3/1997 | Takahashi | 369/112 |

FOREIGN PATENT DOCUMENTS

| | | |
|---|---|---|
| 1-315040 | 12/1989 | Japan . |
| 1-315041 | 12/1989 | Japan . |

*Primary Examiner*—David C. Nelms
*Assistant Examiner*—Kim-Kwok Chu
*Attorney, Agent, or Firm*—Sughrue,Mion,Zinn,Macpeak & Seas, PLLC

[57] ABSTRACT

A super-resolution optical head device includes a diffraction grating having central and peripheral areas. The central area suppresses zero order diffracted light and produces ±1th order diffracted light. The peripheral area produces both zero order diffracted light and ±1th order diffracted light. The ±1th order diffracted light from the central and peripheral areas forms side light beams without an aperture. The side light beams form side spots on a recording medium. The side spots are not accompanied by side lobes because the side light beams do not have an aperture therein.

12 Claims, 8 Drawing Sheets

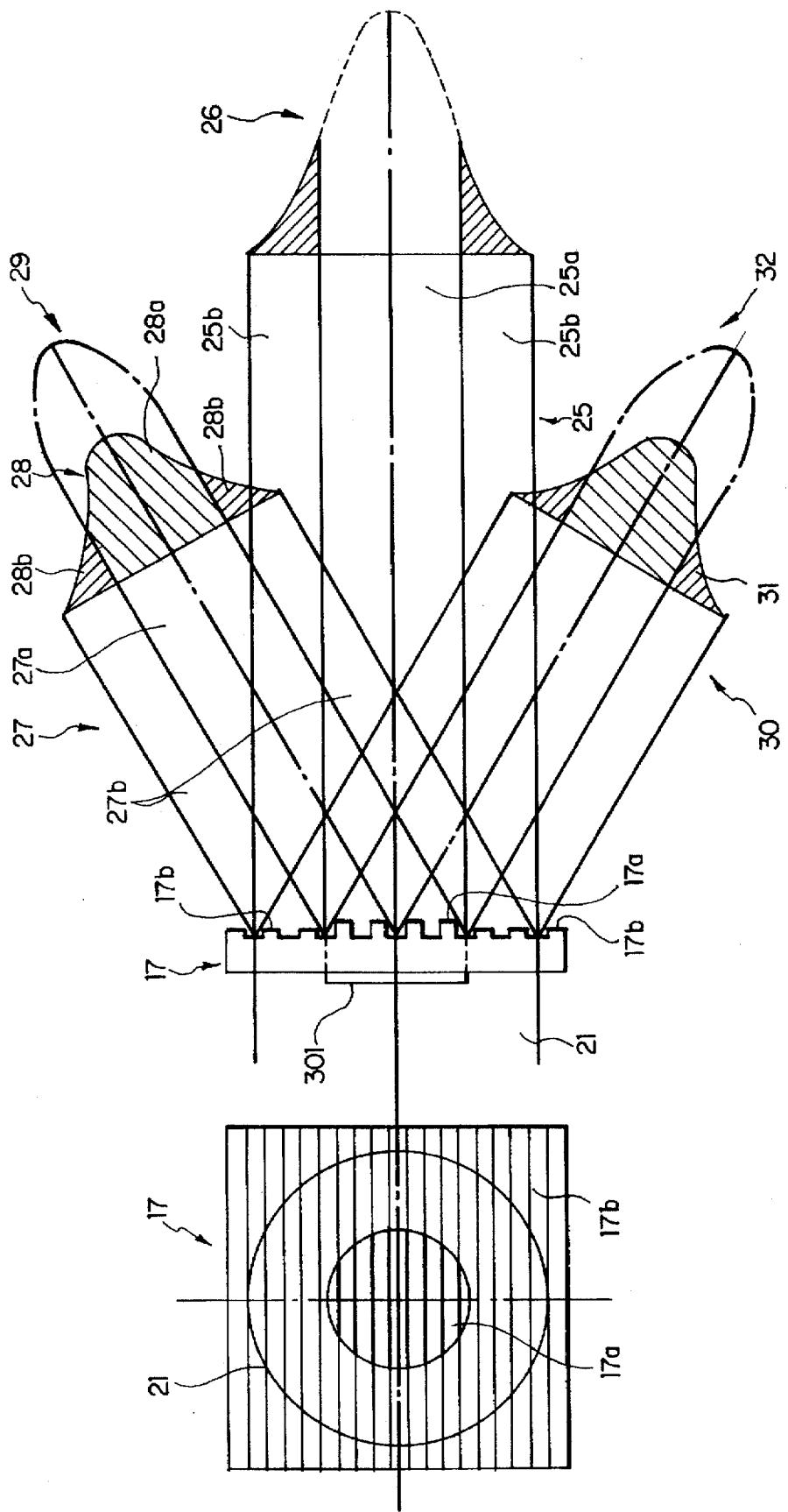

SUPER-RESOLUTION OPTICAL HEAD DEVICE WHICH PRODUCES SIDE SPOTS WITHOUT SIDE LOBES

BACKGROUND OF THE INVENTION

The present invention relates to an optical head device used in an optical storage apparatus, and more particularly to a super-resolution optical head device.

Numerous attempts have been made to reduce the diameter of an optical spot formed on a recording medium in order to increase the recording density of the recording medium. However, the lower limit of a spot diameter is imposed by the wavelength of a laser beam and the NA (numerical aperture) of an objective lens.

Super-resolution optical heads are developed to reduce the spot diameter beyond the aforementioned limitation. Examples of the super-resolution optical heads are disclosed in Unexamined Japanese Patent Publication Nos. 315040/89 and 315041/89.

Referring to FIG. 10, in a super-resolution optical head device, a collimating lens 2 converts laser light from a laser source 1 into parallel ray light. The parallel ray light from the collimating lens 2 is launched upon a super-resolution modulator 51. The super-resolution modulator 51 gives a super-resolution effect to the light passing therethrough. A diffraction grating 52 splits the light from the super-resolution modulator 51 into three light beams to produce a pair of side spots 8a and 8b and a main spot 8 therebetween.

Referring to FIG. 11, the diffraction grating 52 has a uniform structure. The diffraction grating 52 has convex portions 521 and concave portions 522 arranged alternatively. The pitch, the height and the width of the concave portions 522 are uniform all over the diffraction grating 52. The width of the convex portions 521 is also uniform.

The laser light from the laser source 1 has an Gaussian-like intensity distribution 22. The super-resolution modulator 51 cuts off a central portion of the laser light 21. The light from the super-resolution modulator 51 has an intensity distribution 124. The intensity distribution 124 has a central portion 124a and a peripheral portion 124b. The intensity in the central portion 124a is reduced to almost zero. Thus, an aperture is formed in the light beam 124. Accordingly, the light beam has an annular form.

The light beam 124 from the super-resolution modulator 51 is launched on the diffraction grating 52. The diffraction grating 52 produces zero order diffracted light 125, +1th order diffracted light 127 and −1th order diffracted light 130. Each of the diffracted light 125, 127 and 130 has an aperture at central portions 125a, 127a and 130a, respectively.

Referring to FIG. 12, the main spot 8 has an annular side lobe 42 surrounding the main spot 8. Similarly, the side spots 8a and 8b have annular side lobes 42a and 42b, respectively. The side spots 8a and 8b are located on opposite sides of a track 41 formed on the recording medium 7. The side spots 8a and 8b are turned about the main spot 8 by a slight angle. The main spot 8 and the side spots 8a and 8b have similar intensity distributions.

Referring again to FIG. 10, information signal light from the recording medium 7 passes through the objective lens 6 and the quarter-wave plate 5. The light from the quarter-wave plate 5 is directed to a beam splitter 9 by the polarizing beam splitter 4. The beam splitter 9 splits the light into two light beams, which are directed to lenses 13 and 10, respectively. The light from the lens 13 is filtered by a pin hole 14. The pin hole 14 removes side lobes accompanying the information signal light. The light from the pin hole 14 is received by an optical detector 15. The optical detector 15 generates a readout signal. The light from the lens 10 passes through a cylindrical lens 11. The cylindrical lens 11 causes astigmatism in the light passing therethrough. The light from the cylindrical lens 11 is received by an optical detector 12.

The position of the main spot 8 is controlled by a three beam method so that the main spot 8 follows the track 41. According to the three beam method, a track error signal representing the deviation of the main spot 8 is produced based on the difference in a light intensity between the side spots 8a and 8b. The intensity of the side spots 8a and 8b is detected by the optical detector 12.

The focus of the main spot 8 is controlled based on the astigmatism caused by the cylindrical lens 11. The astigmatism is detected by the optical detector 12.

The aforementioned prior head device has the following shortcomings. As shown in FIG. 12, the prior head device produces side lobes 42a and 42b surrounding the side spots 8a and 8b, respectively. The optical detector 12 receives not only the side spots 8a and 8b but also side lobes 42a and 42b. Reflection light from the side lobes 42a and 42b is effected by the tracks adjacent to the track 41 on which the main spot 8 is positioned. The adverse effect of the adjacent tracks causes noises in the track error signal generated by the detector 12. The noise in the track error signal disturbs the positioning control of the main spot 8.

SUMMARY OF THE INVENTION

One object of the present invention is to remove the side lobes accompanying the side spots.

Another object of the present invention is to reduce the light power losses in a super-resolution optical head device.

Yet another object of the present invention is to enhance the controllability of a main spot. Specifically, noise in a track error signal is eliminated or reduced.

According to the present invention, the side lobes of the side spots are removed by forming the side spots from light beams without an aperture. A super-resolution effect is not caused by light beams without an aperture. Without the super-resolution effect, the side lobes are not produced.

On the other hand, the main spot is formed from a light beam with an aperture. The aperture in the light beam causes a super-resolution effect in the main spot. Due to the super-resolution effect, the main spot size is reduced beyond the aforementioned limitation.

More specifically, according to the present invention, a super-resolution optical head device receives an incident light beam from a light source and forms a first light beam and a pair of second light beams. The incident light beam has first and second portions.

The super-resolution optical head device includes a diffraction grating. The diffraction grating has first and second areas. The first area of the diffraction grating suppresses zero order diffracted light and produces ±1th diffracted light. The second area of the diffraction grating produces both zero and ±1th order diffracted light.

The first and second areas of the diffraction grating receive the first and second portions of the incident light beam, respectively. The zero order diffracted light from the second area of the diffraction grating forms the first light beam with an aperture. The ±1th order diffracted light from the first and second areas of the diffraction grating forms the pair of second light beams without an aperture.

Other objects, advantages, and novel features in accordance with the present invention will become more apparent from the following detailed description of preferred embodiments thereof, considered in conjunction with the accompanying drawings wherein:

BRIEF DESCRIPTION OF THE DRAWINGS

FIG. 4 shows a structure of a second embodiment of the present invention.

DETAILED DESCRIPTION OF THE PREFERRED EMBODIMENT OF THE INVENTION

Next a first embodiment of the present invention will be described.

Figure 1:
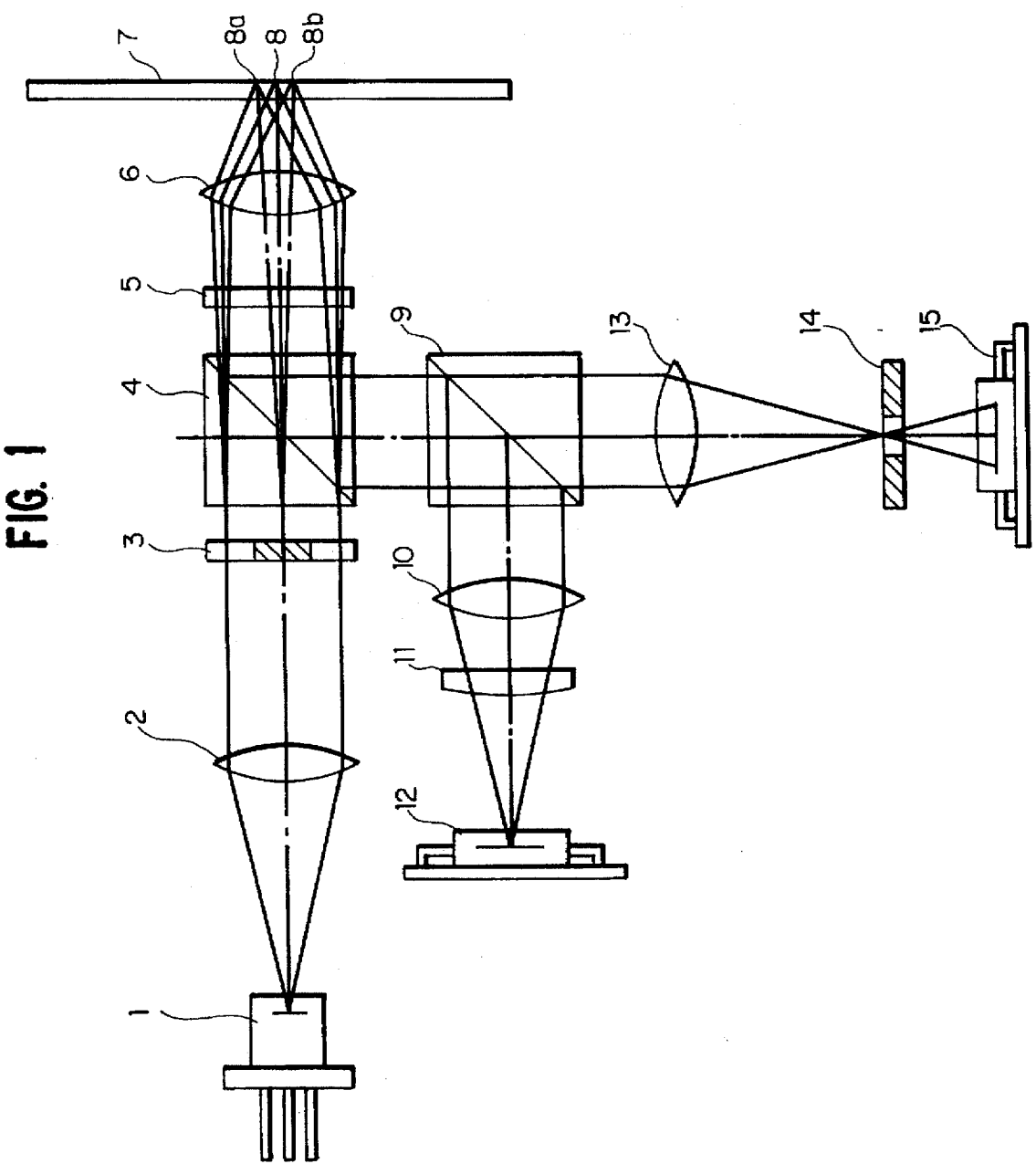
FIG. 1 shows a structure of an optical system incorporating a super-resolution optical head device according to a first embodiment of the present invention.
Figure 10:
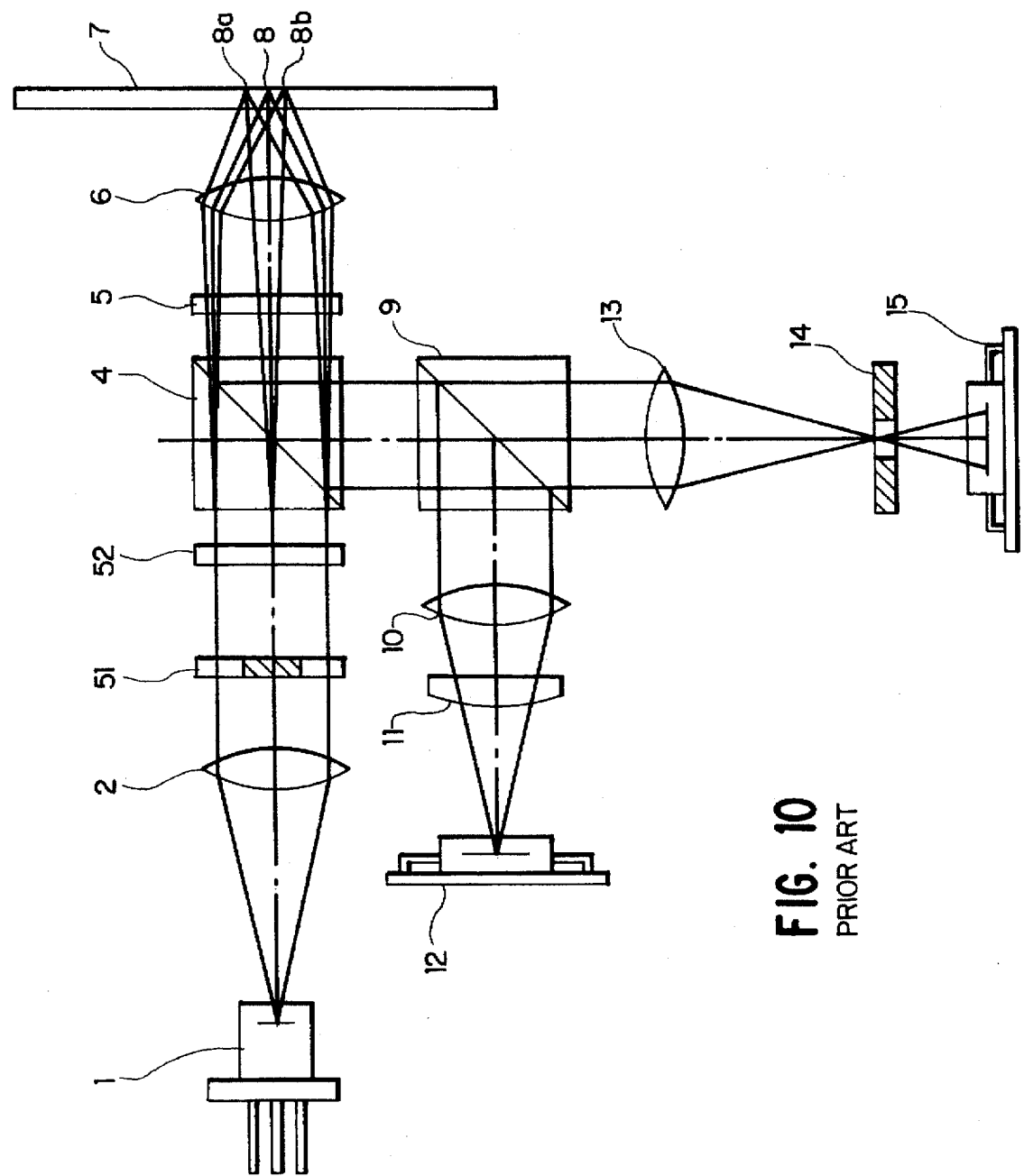
FIG. 10 shows a structure of an optical system incorporating a prior super-resolution optical head.

Referring to FIG. 1, a key feature of the first embodiment is the structure of super-resolution modulator 3. The other structures and functions of the optical system incorporating a super-resolution optical head device according to the first embodiment are substantially the same as those depicted in FIG. 10.

Figure 2:
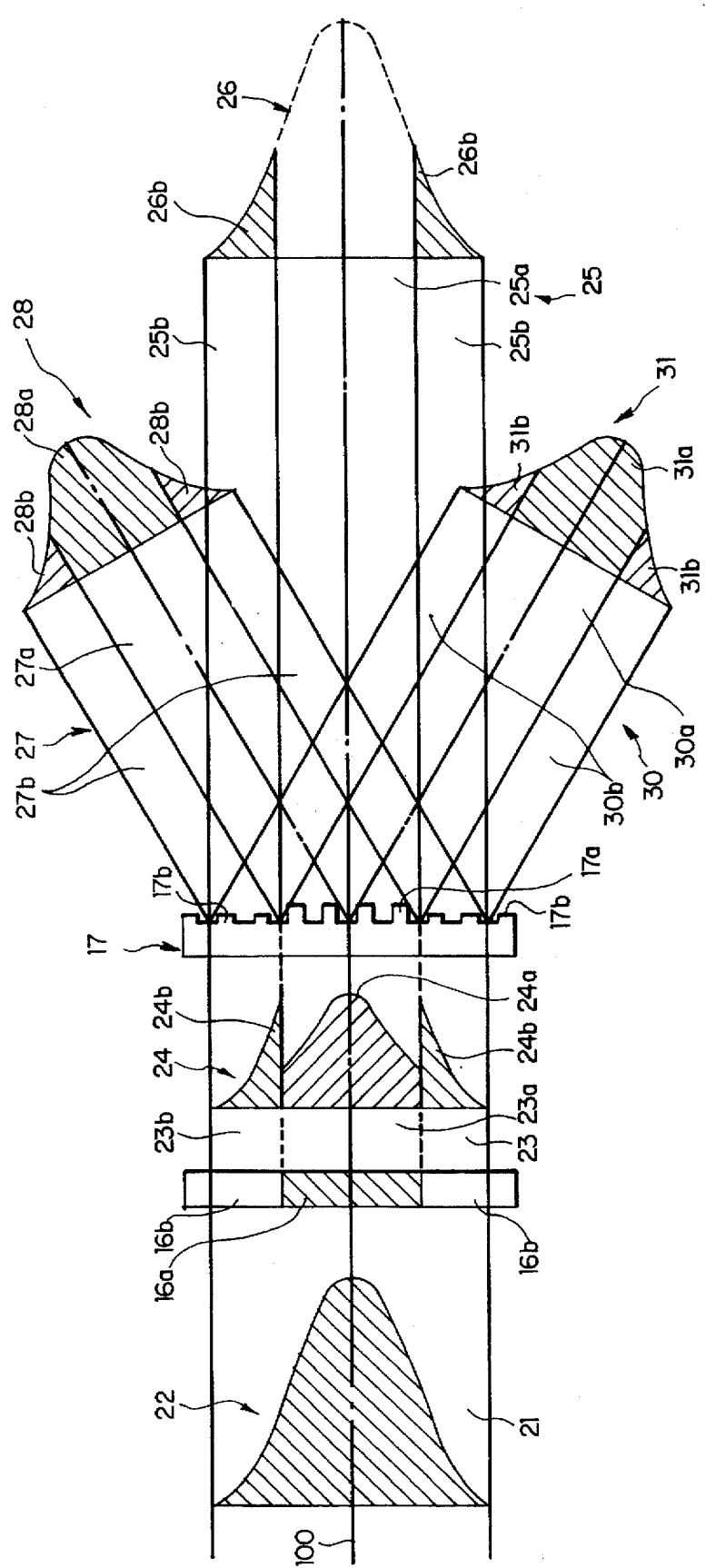
FIG. 2 explains functions of a diffraction grating and a filter according to the first embodiment of the present invention.

Referring to FIG. 2, the super-resolution modulator 3 includes a filter 16 and a diffraction grating 17. The filter 16 and the diffraction grating 17 have structures symmetrical about an axis 100.

The filter 16 receives an incident light beam 21 having a Gaussian-like intensity distribution 22. The filter 16 has a central portion 16a and a peripheral portion 16b receiving central and peripheral portions of the incident light beam 21, respectively. The central portion 16a of the filter 16 reduces the intensity of the central portion of the incident light beam 22. The peripheral portion 16b of the filter 16 does not reduce the intensity of the peripheral portion of the incident light beam 21 significantly.

Due to the intensity attenuation at the central portion 16a, the light beam 23 from the filter 16 has an intensity distribution 24. The central portion 24a of the distribution 24 shows a reduced intensity whereas the peripheral portion 24b has almost the same distribution as that of incident light beam 21.

The filter 16 can be formed by deposition of a metal thin film, provision of a reflecting coating, or application or diffusion of a light-absorbing material. The phase difference between the light from the central area 17a and that from the peripheral areas 17b can be compensated for by provision of a phase compensating film.

The diffraction grating 17 has central and peripheral areas 17a and 17b. The central and peripheral areas 17a and 17b receive central and peripheral portions 24a and 24b of light from the central and peripheral portions 16a and 16b of the filter 16, respectively. The central area 17a has a circular shape and is surrounded by the peripheral area 17b that has an annular shape.

The central area of the diffraction grating 17a is preferably a phase type perfect grating. The structures of the concave and convex portions are uniform in the central area 17a. The central area 17a is designed so that the central area 17a suppresses zero order diffracted light (transmission light) and produces ±1th order diffracted light. Preferably, the central area 17a of the diffraction grating 17 does not produce zero order diffracted light at all. Such a function can be given to the central area 17a by adjusting the pitch, the height and the width of the convex portions and by adjusting the width of the concave portions.

The peripheral area 17b has a different function. The peripheral area 17b is a phase type diffraction grating. The peripheral area 17b is designated so that it produces both zero order diffracted light and ±1th order diffracted light. The ratio between the intensity of the zero order diffracted light and that of the ±1th order diffracted light is set to a predetermined value.

Such a function can be given to the peripheral area 17b by adjusting the height and the width of the convex portions and by adjusting the width of the concave portions. Due to functional differences, those structural parameters may be different from those of the central area 17a. Despite these structural differences, the central and peripheral areas 17a and 17b have the same pitch of convex portions.

The zero order diffracted light from the peripheral portion 17b of the diffraction grating 17 forms a main light beam 25. The main light beam 25 forms a main spot on a recording medium. The ±1th order diffracted light from the central and peripheral portions 17a and 17b of the diffraction grating 17 forms a pair of side light beams 27 and 30. The light beams 27 and 30 form a pair of side spots on the recording medium.

As illustrated in FIG. 2, the main light beam 25 has a low intensity region at a central portion 25a thereof because the central area 17a of the diffraction grating 17 suppresses the zero order diffracted light. The peripheral portion 25b of the main light beam 25 has a Gaussian-like intensity distribution 26b because the peripheral portion 17b of the diffraction grating 17 produces the zero order diffracted light.

Thus, the main light beam 25 has an annular shape with an aperture at the central portion 25a thereof. Being shaped in an annular shape, the main light beam 25 undergoes a super-resolution effect in the optical system depicted in FIG. 1. Due to the super-resolution effect, the main light beam 25 forms a main spot having a diameter less than the limitation described above.

The side light beams 27 and 30 have central portions 27a and 30a, respectively. The central portions 27a and 27b have Gaussian-like intensity distributions 28a and 31a, respectively, because the central portion 17a of the diffraction grating 17 produces the ±1th order diffracted light. The side light beam 27 and 30 also have peripheral portions 27b and 30b, respectively. The peripheral portions 27b and 30b have Gaussian-like distributions 28b and 31b, respectively, because the peripheral portion 17b of the diffraction grating 17 produces the ±1th order diffracted light. The intensity distributions 28a and 28b can be connected smoothly by adjusting the transmissivity of the filter 16. When a smooth connection is achieved, the intensity distribution 28 becomes similar to the distribution 22 of the incident light beam 21. Specifically, if the distribution 28 is multiplied by a predetermined value, the distribution 28 is almost the same as the distribution 22.

The side light beams 27 and 30 have Gaussian-like intensity distributions without an aperture. The side light beams 27 and 30 do not undergo a super-resolution effect because the side beams 27 and 30 do not have an aperture therein. Thus, the side lobes of the side spots are eliminated.

Next, a method for adjusting the transmissivity of the filter 16 will be described.

Although a smooth connection between the intensity distributions 28a and 28b is not a critical requirement, it may enhance the effect of the present invention. Such a smooth connection can be achieved by adjusting the height of the central distribution 28a to that of the peripheral distribution 28b. The height of the distribution 28a can be adjusted by selecting the transmissivity of the central portion 16a of the filter 16.

Hereinafter, "A" refers to the ratio between the intensity of the central portion 23a of the light beam 23 and that of the central portion 27a of the side light beam 27. "B" refers to the ratio between the intensity of the peripheral potion 23b of the light beam 23 and that of the peripheral portion 27b of the side light beam 27. "T" refers to the transmissivity of the central portion 16a of the filter 16. The peripheral portion 16b is assumed to have a transmissivity of 100%.

The smooth connection is achieved if A*T is equal to B. This means that the transmissivity T is set to B/A. An example is given below.

In this explanatory situation, the central area 17a of the diffraction grating 17 produces the zero order diffracted light, the ±1th order diffracted light and other diffracted light having 0%, 90% and 10% intensity ratios, respectively. The peripheral area 17b of the diffraction grating 17 produces the zero order diffracted light, the ±1th order diffracted light and other diffracted light having 60%, 30% and 10% intensity ratios, respectively. Under this assumption, the values A and B are 90% and 30%, respectively. Therefore, if the transmissivity T of the central portion 16a of the filter 16 is set to 33%, distributions 28a and 28b are connected smoothly.

Next, the shape of the main and side spots formed by the first embodiment will be described.

Figure 3:
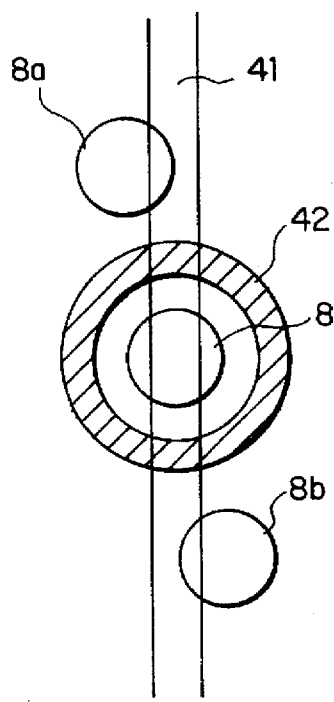
FIG. 3 illustrates main and side spots produced by the first embodiment of the present invention.

Referring to FIG. 3, the main light beam 25 forms a main spot 8 on a track 41 on a recording medium. The main light beam 25 also forms an annular side lobe 42 surrounding the main spot 8 because the main light beam 25 has an aperture therein.

Figure 12:
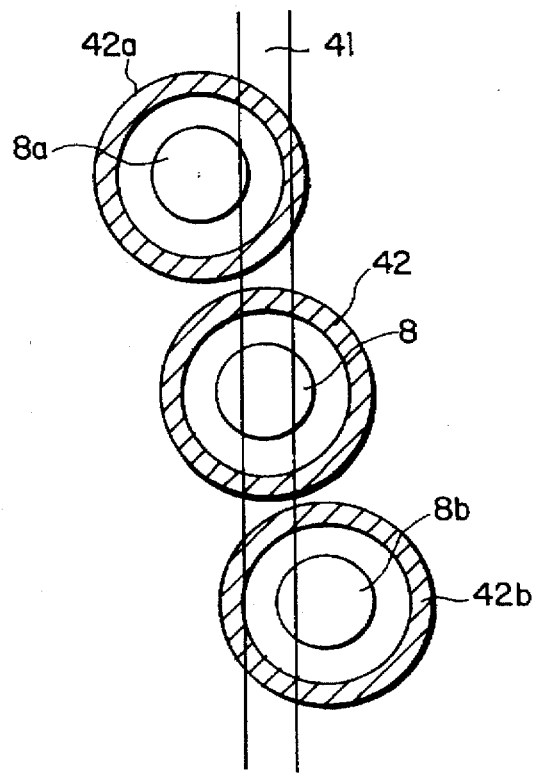
FIG. 12 illustrates main and side spots produces by the prior super-resolution optical head device.

The side light beams 27 and 30 forms side spots 8a and 8b, respectively. The side spots 8a and 8b are not accompanied by side lobes because the side light beams 27 and 30 have Gaussian-like distributions without an aperture. The positional relationship between the main spot 8 and the side spots 8a and 8b are the same as that depicted in FIG. 12.

Figure 11:
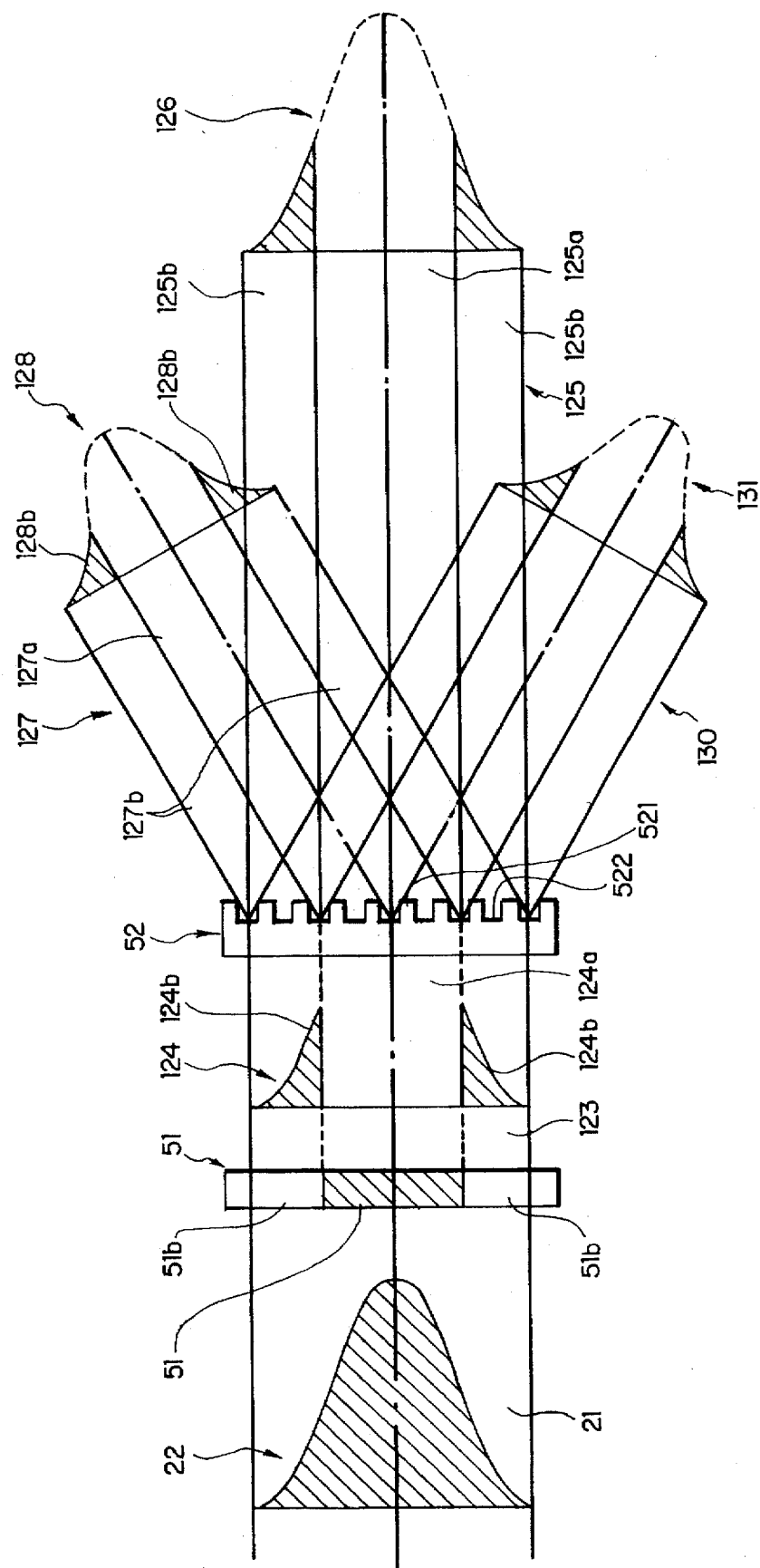
FIG. 11 shows functions of a diffraction grating and a super-resolution modulator of the prior super-resolution optical head.

As noted above, the first embodiment eliminates the side lobes of the side spots to reduce the adverse effect of the side lobes. Additionally, unlike the prior filter 51 depicted in FIG. 11, the central portion 16a of the filter 16 does not cut off but transmits the incident light. Thus, the light power losses in the head device are reduced.

Next a second embodiment of the present invention will be described. A key feature of the second embodiment is the structure of the filter. Other structures and functions are substantially the same as those of the first embodiment.

Referring to FIG. 4, the filter 301 substitutes for the filter 16 of the first embodiment. The filter 301 is attached to the lower flat surface of the diffraction grating 17. That is, the filter 301 is integrated into the diffraction grating 17. The filter 301 has the same function as that of the central portion 16a of the filter 16. Hence, the incident light beam 21 is processed in the same way as in the first embodiment. A main spot and side spots formed by the second embodiment have the same shape and configuration as those depicted in FIG. 3.

Next a third embodiment of the present invention will be described. A key feature of the third embodiment is the structure of the diffraction grating 17. Other structures and fictions are the same as those of the first embodiment.

Figure 5A:
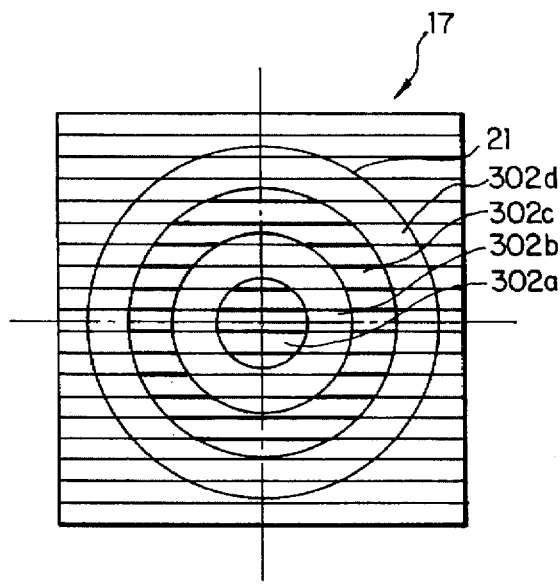
FIGS. 5A and 5B show a structure of a diffraction grating according to a third embodiment of the present invention.
Figure 5B:
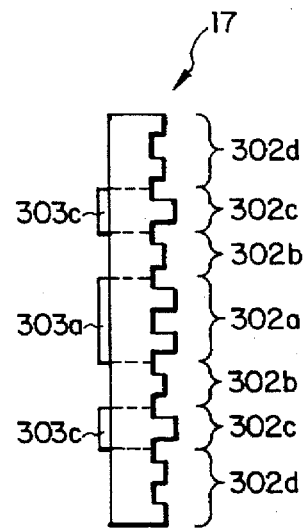

Referring to FIGS. 5A and 5B, the diffraction grating 17 of the third embodiment has areas 302a, 302b, 302c and 302d. The area 302a has a circular shape. The areas 302b, 302c and 302d have annular shapes. The areas 302a, 302b and 302c are surrounded by the areas 302b, 302c and 302d, respectively.

Filters 303a and 303c are attached to the lower surface of the diffraction grating 17. The filters 303a and 303c have the same shape as those of the areas 302a and 302c. The filters 303a and 303c are attached to the positions corresponding to the areas 302a and 302c, respectively. The areas 302a and 302c are designed to have the same function as that of the central area 17a of the diffraction grating 17. The areas 302b and 302d are designed to have the same function as that of the peripheral area 17b of the diffraction grating 17. The filters 303a and 303c are designed to have the same function as that of the filter 301 of the second embodiment.

Figure 6:
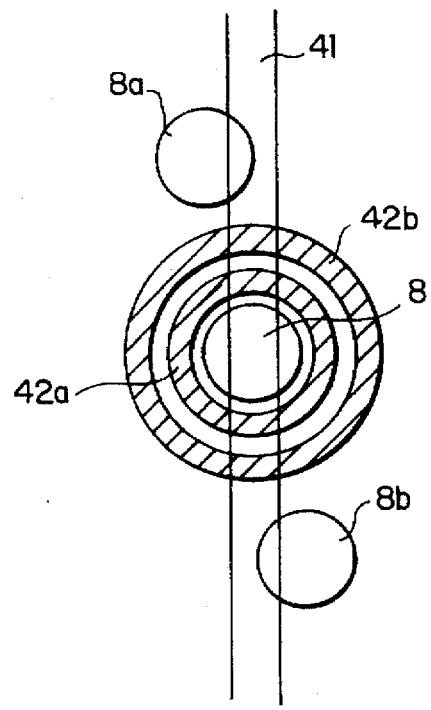
FIG. 6 illustrates main and side spots produced by the third embodiment of the present invention.

Referring to FIG. 6, in the third embodiment, the main light beam 25 forms side lobes 42a and 42b. The shapes of the side spots 8a and 8b are substantially the same as those of the first embodiment.

According to the third embodiment, the intensity distribution of the side lobes 42a and 42b are adjustable through the dimensional adjustment of the areas 302a to 302d. Adjustment of the side lobe distribution allows the elimination or reduction of the adverse effect of the side lobe around the main spot.

Next, a fourth embodiment of the present invention will be described. A key feature of the fourth embodiment is the structure of the diffraction grating 17. Other structures and functions are substantially the same as those of the second embodiment.

Figure 7A:
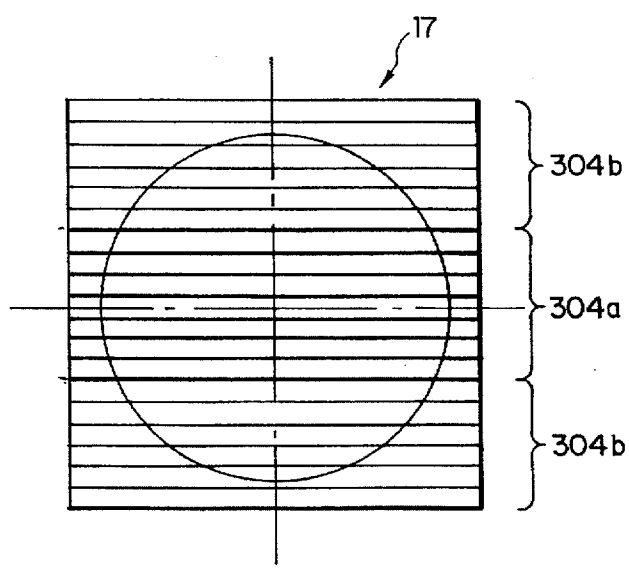
FIGS. 7A and 7B show a structure of a diffraction grating according to a fourth embodiment of the present invention.
Figure 7B:
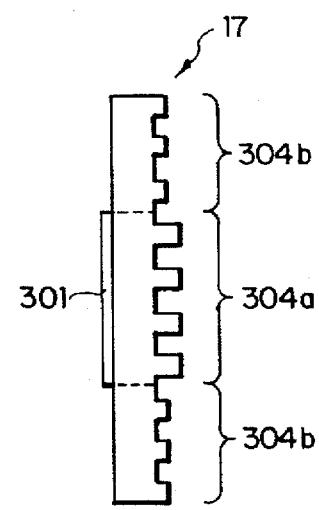

Referring to FIGS. 7A and 7B, the diffraction grating 17 of the third embodiment has areas 304a, 304b and 304c. Unlike the areas 17a and 17b of the second embodiment, the areas 304a to 304c have rectangular shapes. The area 304a is interposed between the areas 304b and 304c. The area 304a is designed to have substantially the same function as that of the central portion 17b of the second embodiment. The areas 304b and 304c are designed to have substantially the same function as that of the peripheral area 17b of the second embodiment.

Figure 8:
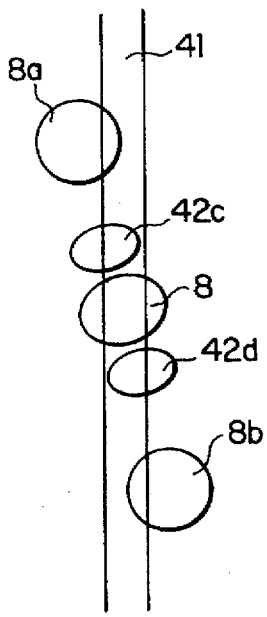
FIG. 8 illustrates main and side spots produced by the fourth embodiment of the present invention.

Referring to FIG. 8, in the fourth embodiment, side lobes 42c and 42d are formed on the opposite sides of the main spot 8. According to the third embodiment, the total intensity of the side lobes 42c and 42d is decreased, and the adverse effect of the side lobes 42c and 42d is reduced.

Next the fifth embodiment of the present invention will be described. The key feature of the fifth embodiment is the structure of the optical system incorporating the super-resolution optical head device.

Figure 9:
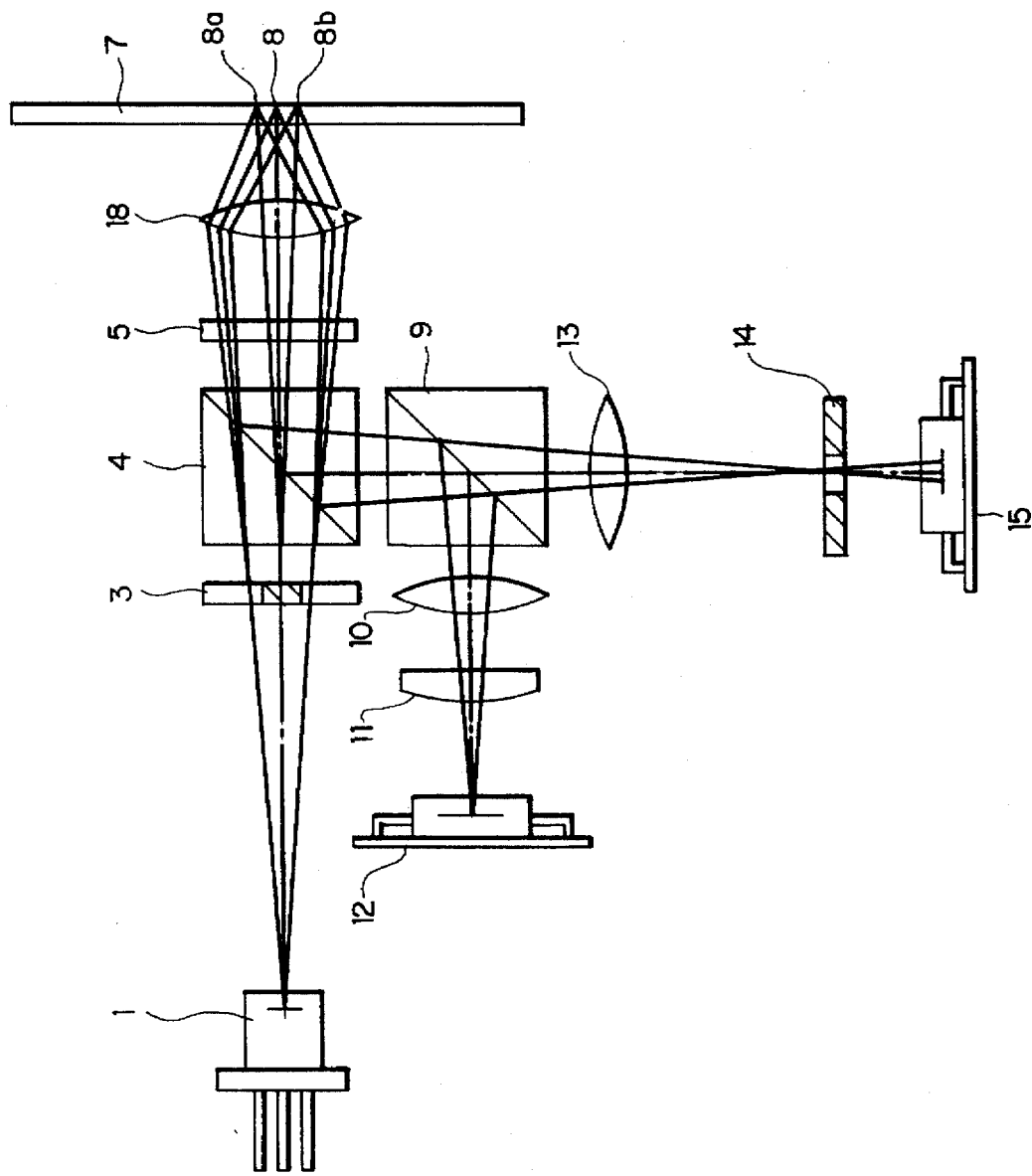
FIG. 9 shows a structure of an optical system according to a fifth embodiment of the present invention.

Referring to FIG. 9, in the fifth embodiment, the super-resolution modulator 3 receives the incident light beam from the laser source 1 directly. The collimating lens 2 depicted in FIG. 1 is removed. Instead of the objective lens 6, a finite system objective lens 18 is placed between the quarter-wave plate 5 and the recording medium 7. According to the fifth embodiment, the size of the optical system can be reduced since the collimating lens 2 is removed.

The invention may be embodied in other specific forms without departing from the spirit or essential characteristics thereof. For example, features of the first to fifth embodiment may be combined. The present invention is applicable to read-only type recording media, additional-write-type recording media and rewritable recording media. The present invention is applicable to any type of focus error detecting method.

The present embodiments should be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A super-resolution optical head device receiving an incident light beam from a light source and forming a first light beam and a pair of second light beams, said incident light beam comprising central and peripheral portions, said super-resolution optical head device comprising:

a diffraction grating having first and second areas, said first area of said diffraction grating suppressing zero order diffracted light and producing ±1th diffracted light, and said second area of said diffraction grating producing zero and ±1th order diffracted light, wherein said first and second areas of said diffraction grating receive said central and peripheral portions of said incident light beam, respectively, the zero order diffracted light from said second area of said diffraction grating forms said first light beam with an aperture, and the ±1th order diffracted light from said first and second areas of said diffraction grating forms said pair of second light beams without an aperture.

2. A super-resolution optical head device according to claim 1, wherein said first and second areas of said diffraction grating have different structures.

3. A super-resolution optical head device according to claim 2, wherein said diffraction grating has convex and concave portions, and wherein said first and second areas of said diffraction grating are distinct from each other in at least one of a height of said convex portion, a width of said convex portion, and a width of said concave portion.

4. A super-resolution optical head device according to claim 3, wherein said first and second areas of said diffraction grating have the same pitch.

5. A super-resolution optical head device according to claim 1, further comprising:

a filter interposed between the light source and said diffraction grating for reducing an intensity of said central portion of said incident light beam.

6. A super-resolution optical head device according to claim 5, wherein said filter is integrated into said diffraction grating.

7. A super-resolution optical head device according to claim 5, wherein each of said second light beams has central and peripheral portions, the ±1th order diffracted light from said first area of said diffraction grating forms said central portion of said second light beams, and the ±1th order diffracted light from said second area of said diffraction grating forms said peripheral portion of said second light beams.

8. A super-resolution optical head device according to claim 7, wherein a transmissivity of said filter is adapted so that said central and peripheral portions of said second light beams connect smoothly.

9. A super-resolution optical head device according to claim 1, wherein said diffraction grating receives said incident light beam from said light source directly.

10. A super-resolution optical head device according to claim 1, wherein said diffraction grating further comprises third and fourth areas having the same structure as said first and second areas, respectively, and said first, second, and third areas are surrounded by said second, third, and fourth areas, respectively.

11. A super-resolution optical head device according to claim 1, wherein said diffraction grating has a pair of said second areas, and said first area is interposed between said pair of said second areas.

12. A super-resolution optical head device according to claim 1, further comprising:

a collimating lens interposed between the light source and said diffraction grating for converting said incident light beam from said light source into parallel ray light.

* * * * *